United States Patent
Kraus et al.

(10) Patent No.: US 9,632,811 B2
(45) Date of Patent: Apr. 25, 2017

(54) VIRTUALIZATION OF PURPOSE-BUILT DEVICES

(71) Applicant: CA, Inc., Islandia, NY (US)

(72) Inventors: Christopher C. Kraus, Dallas, TX (US); Rajagopal R. Rao, Morgan Hill, CA (US); James Stephen Kress, Double Oak, TX (US)

(73) Assignee: CA, Inc., Islandia, NY (US)

( * ) Notice: Subject to any disclaimer, the term of this patent is extended or adjusted under 35 U.S.C. 154(b) by 19 days.

(21) Appl. No.: 14/668,931

(22) Filed: Mar. 25, 2015

(65) Prior Publication Data
US 2016/0283352 A1    Sep. 29, 2016

(51) Int. Cl.
| | |
|---|---|
| G06F 9/44 | (2006.01) |
| G06F 9/445 | (2006.01) |
| G06F 9/455 | (2006.01) |
| G06F 3/0482 | (2013.01) |
| G06F 3/0484 | (2013.01) |
| H04L 12/24 | (2006.01) |

(52) U.S. Cl.
CPC ........ *G06F 9/45558* (2013.01); *G06F 3/0482* (2013.01); *G06F 3/04842* (2013.01); *H04L 41/00* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,146,057 B1 | 3/2012 | Michelsen | |
| 2015/0212920 A1* | 7/2015 | Kraus | ............... G06F 11/3466 717/127 |
| 2015/0286560 A1 | 10/2015 | Michelsen | |

* cited by examiner

*Primary Examiner* — Chuck Kendall
(74) *Attorney, Agent, or Firm* — Patent Capital Group

(57) ABSTRACT

A virtual instance of a hardware device is generated from device profile model data. The virtual instance of the hardware device simulates operation of the hardware device. The simulated operation includes interacting with a software service over a network connection by generating, at the virtual instance, message data to push to a host of the software service over the network connection, receiving request data from the software service over the network connection, and generating a simulated response to the request data. The simulated operation further includes sending the simulated response from the virtual instance to the host over the network connection and modeling a physical effect measured by the hardware device during the interaction with the software service. Data sent by the virtual instance during the interaction is based on the modeled physical effect.

22 Claims, 10 Drawing Sheets

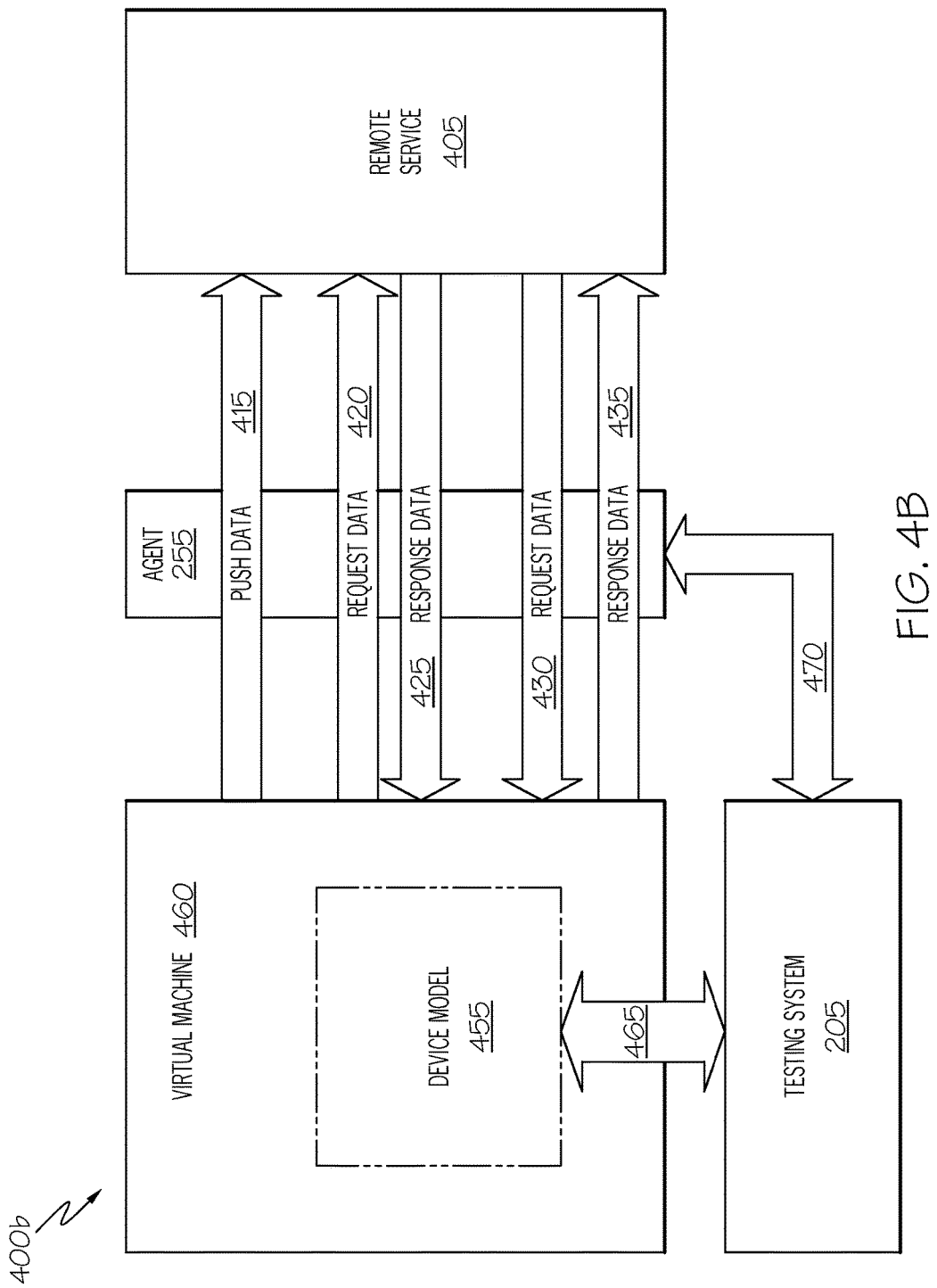

DEVICE PROFILE: SPIN BIKE

COMM. TYPE: ⊙ WIFI  ⊙ BLUETOOTH

BATTERY STORAGE: 8000mAh  % USED WHILE POWERD ON 1% / 10 MINS

GET EVENTS:
<NONE>

PUSH EVENTS:
EVERY: 2 SECONDS
☒ RPM           4mAh
☒ WATTS         4mAh
☒ DISTANCE      6mAh

DATA REQUESTS:
☒ IS POWERED ON?
☐ LIGHT ON?
☒ % BATTERY LEFT?
☒ WHEEL IN MOTION?

FIG. 6B

BEHAVIOR PROFILE: FAST FLATS

RPM: 87 - 110          DISTRIBUTION: BELL +/- 2 STD ▷

WATTS: 200 - 340       DISTRIBUTION: RANDOM ▷

DISTANCE: 0 - 14 MILES DISTRIBUTION: EVEN INCREMENT ▷

LIGHT "ON" DURATION: 10 SEC    POWER: 4 mAh

FIG. 6C

VIRTUALIZATION OF PURPOSE-BUILT DEVICES

BACKGROUND

The present disclosure relates in general to the field of computer development, and more specifically, to virtualizing computing system elements within the context of software development and testing.

Smart phones, tablet computers, wearables, and other mobile computing devices have become very popular, even supplanting larger, more general purpose computing devices, such as traditional desktop computers in recent years. Increasingly, tasks traditionally performed on a general purpose computer are performed using mobile computing devices with smaller form factors and more constrained features sets and operating systems. Further, traditional appliances and devices are becoming "smarter" as they are equipped with functionality to connect to or consume content from the Internet. For instance, devices, such as televisions, gaming systems, household appliances, thermostats, automobiles, watches, have been outfitted with network adapters to allow the devices to connect with the internet (or another device) either directly or through a connection with another computer connected to the network. The interconnection of an increasingly large number of devices, or "things," is believed to foreshadow a new era of advanced automation and interconnectivity, referred to, sometimes, as the Internet of Things (IoT).

BRIEF SUMMARY

According to one aspect of the present disclosure, a virtual instance of a hardware device can be generated from device profile model data. The virtual instance of the hardware device can simulate operation of the hardware device. The simulated operation can include interacting with a software service over a network connection by generating, at the virtual instance, message data to push to a host of the software service over the network connection, receiving request data from the software service over the network connection, and generating a simulated response to the request data. The simulated operation can further include sending the simulated response from the virtual instance to the host over the network connection and modeling a physical effect measured by the hardware device during the interaction with the software service. Data sent by the virtual instance during the interaction can be based on the modeled physical effect.

According to another aspect of the disclosure, a selection of a set of hardware devices to be modeled in association with a test of a software program can be received through a graphical user interface. The hardware devices can be configured to interact with the software program over a network. Virtual instances of each hardware device in the set of hardware devices can be instantiated that can push a message to a host of the software program over the network to simulate a push message to be transmitted by the hardware device corresponding to the virtual instance, receive a request from the software program over the network, generate a simulated response to the request, send the simulated response to the host over the network connection, and model a physical effect measured by the hardware device during interoperation with the software program. One or both of the message and response data can be based on the modeled physical effect.

BRIEF DESCRIPTION OF THE DRAWINGS

FIG. 4B is a simplified block diagram illustrating replacement of the purpose-built device of FIG. 4A with a corresponding virtual device instance in accordance with at least one embodiment;

FIGS. 6A-6C are screenshots of example graphical user interfaces of a testing system in accordance with at least one embodiment;

Like reference numbers and designations in the various drawings indicate like elements.

DETAILED DESCRIPTION

Figure 1:
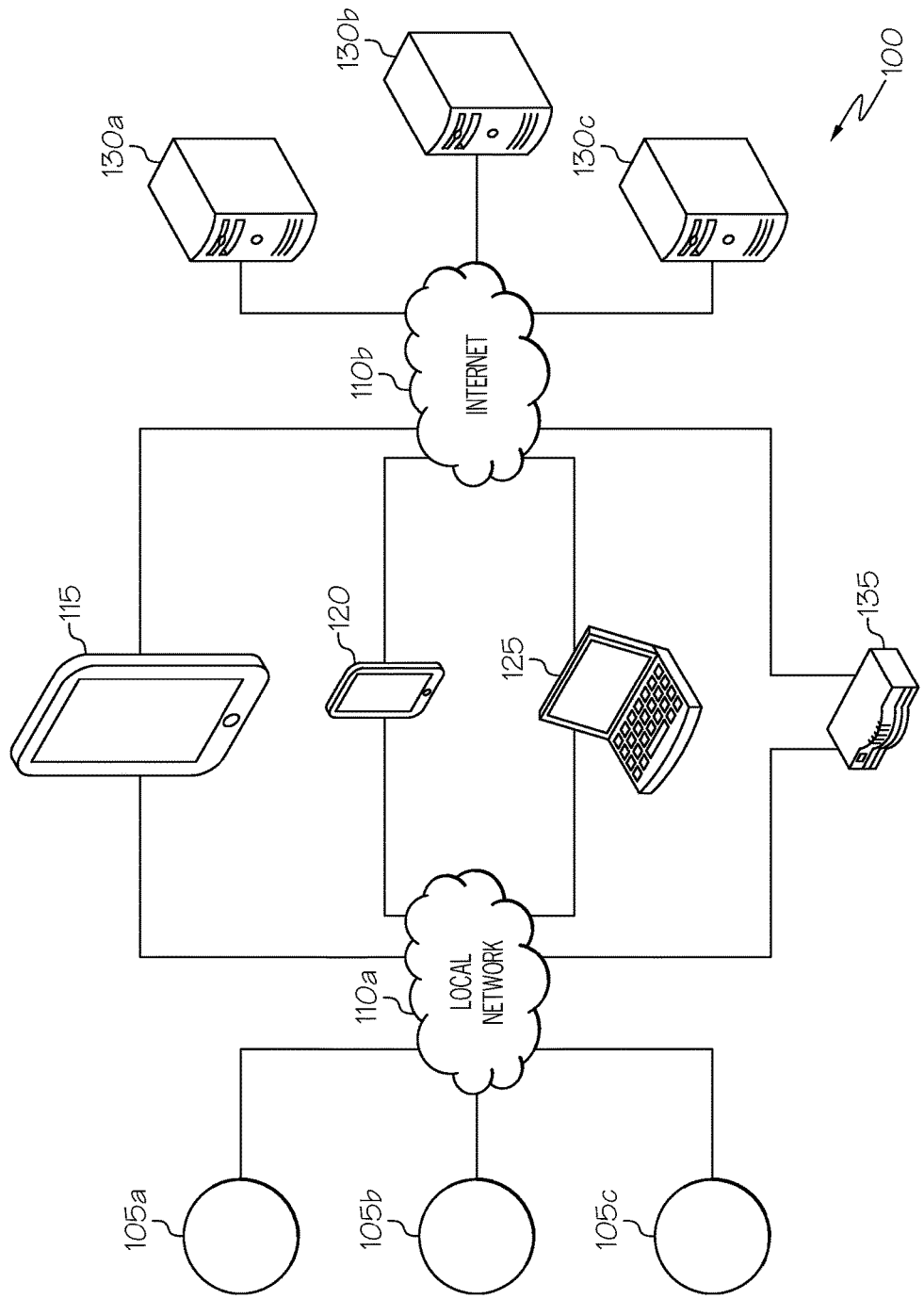
FIG. 1 is a simplified schematic diagram of an example computing system including one or more host systems and one or more purpose-built devices in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including one or more devices 105a, 105b, 105c possessing computing functionality and capable of communicating over one or more networks (e.g., 110a, 110b) with other computing devices, including general purpose personal computing devices such as tablet computers 115, smartphones 120, laptop computers 125, and other examples, such as desktop computers, media servers, home automation management systems, gaming consoles, etc. In some implementations, one or more of the devices 105a-c may possess functionality for communicating with remote devices, such as application and web servers 130a-c, over the Internet (e.g., 110b), through a local router, switch, or other Internet access point (e.g., 135).

Devices can include devices 105a, 105b, 105c (or generally 105) considered to enable the Internet of Things, such as purpose-built devices such as smart watches, smart bracelets, heart rate monitors, smart garments, and other wearable devices that include sensors to monitor human activity and collect biometric activity from its wearer. Devices 105 can be traditional products made "smart" through the integration of computer processing and communications capabilities, such as smart appliances (e.g., smart TVs, smart refrigerators, smart washing machines, etc.), in-vehicle computers, computerized exercise equipment, computerized industrial machines, medical devices, home automation devices, among other examples. The devices 105 can consume or otherwise interact with services provided by other host devices. For instance, devices 105 may interact with a software application installed on a mobile computing device, such as a smartphone 120 or tablet computer 115. For instance, a smart watch may count steps, monitor sleep disturbances, or provide other specialized functions and report this information to the smartphone 120 over local network 110a and this information can be synthesized by the higher-level logic of the application on the smartphone 120. The devices 105 can also provide data for backend services hosted by remote host devices (e.g., 130a-c) connected to the Internet 110b. In some instances, the devices 105 do not possess the ability to connect directly to web resources and first pass their data to general purpose computing devices (e.g., 115, 120, 125), which, in turn, communicate with web servers 130a-c. In other instances, some devices 105 may include network adapters that allow them to communicate with wireless access points or other device (e.g., 135), for instance, using WiFi, and connect to backend webservers 130a-c over the Internet 110b without an intermediary device (e.g., 115, 120, 125).

In some cases, a service provided by a personal general purpose computing device (e.g., 115, 120, 125) or other general purpose computing system (e.g., 130a-c) can interact with potentially multiple devices 105 simultaneously. Indeed, in some cases, a service may interact and consume data from multiple different types of devices 105 in a session or concurrent sessions. As an example, a biometric tracking service may simultaneously serve multiple client biometric tracker devices of multiple different users. In another example, a factory may collect data from a variety of different network-connected sensor devices (e.g., thermistors, pressure sensors, counters, etc.) monitoring functionality and performance of various different tools in a manufacturing facility using a centralized tool monitoring application (e.g., hosted on a general purpose computing system at the manufacturing facility and/or hosted on the cloud). Indeed, as the internet of things foretells, the increasing interconnectivity of things and devices associated with these things, suggests corresponding growth and development in the variety of different services that make use of and synergize this growing universe of devices.

In general, "servers," "clients," "computing devices," "network elements," "database systems," "user devices," and "systems," etc. (e.g., 105a-c, 115, 120, 125, 130a-c, 135, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a virtualization system 105, data source server 110, application server 115, 120, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

The development of services that utilize purpose-built devices, whether hosted on a personal computing device, such as a smartphone or tablet, or hosted on an application or webserver on a wide area network, face similar design and development cycles as conventional software. Included in the development of such services is the testing of the service (and related host systems and software implementing the service), to ensure the service performs as designed. However, unlike general purpose computing devices, which are the typical consumers of traditional services, testing services that use purpose-built devices introduces additional challenges, as tests that incorporate purpose-built devices can be more difficult to design. For instance, purpose-built devices, unlike general purpose devices, often have specialty hardware, including limited purpose processors, operating systems, and software. Seldom can substitute general purpose devices be used as a suitable stand-in for the specialty devices. Further, as specialty devices themselves provide specialty services to physical products and entities, such as the appliances they automate, to the humans or animals they track, the tools they monitor, etc., these products and entities, in some cases, drive the behavior and function of the devices. For instance, to test how a biometric tracking service would perform when connected to 100 wearable fitness tracking devices, the 100 devices not only need to be accounted for, but also the 100 different human users, with their varying behaviors. In some implementations, software models of the devices and physical entities can be generated. Developing a specially-generated model, however, can be expensive and time consuming, as it unlikely to be reusable for other devices. A platform can thus be provided that facilitates the generation of models of multiple different types of purpose-built devices (e.g., 105) including the variable modes and behaviors dependent on the physical entities associated with the devices.

Figure 2:
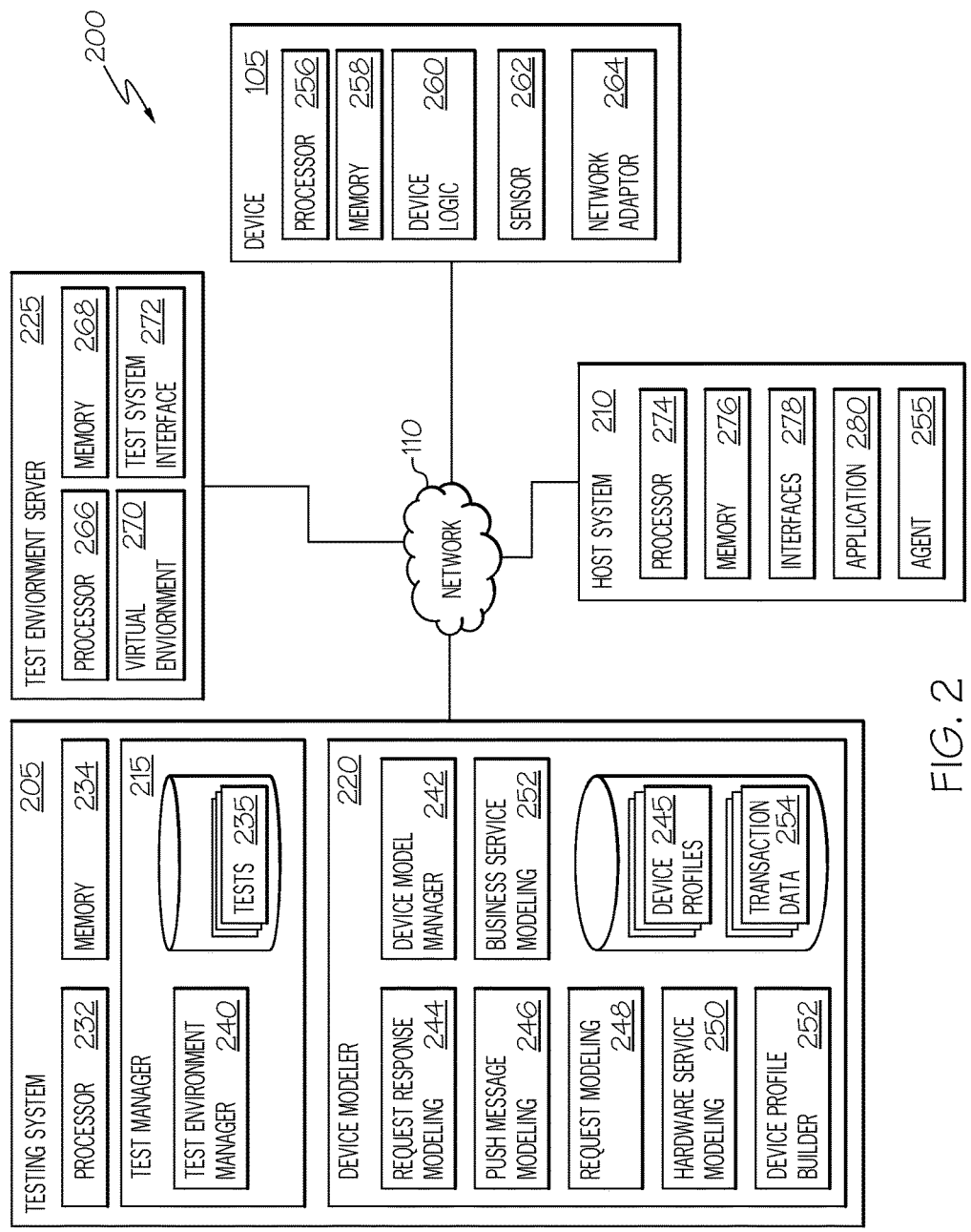
FIG. 2 is a simplified block diagram of an example computing system including an example testing system in accordance with at least one embodiment.

At least some of the systems described in the present disclosure, such as the systems of FIGS. 1 and 2, can include functionality providing at least some of the above-described features that, in some cases, at least partially address at least some of the above-discussed issues, as well as others not explicitly described. For instance, in the example of FIG. 2, a simplified block diagram 200 is shown illustrating an example environment including a testing system 205 for use in testing services hosted by a host system 210. The testing system 205 can include a test manager 215 to launch and manage execution of the test. The testing system 205 can further provide a device modeler 220 that provides a reusable platform for generating virtual, software-based instances of purpose-built devices (e.g., 105) that are to interact with the service as part of the test of the service. In some implementations, at least a portion of the test can be executed in a test environment provided by a test environment server 225.

In some implementations, testing system 205 can include one or more data processing apparatus 232, one or more memory elements 234, and components implemented in machine-executable hardware- and/or software-based logic, such as test manager 215 and device modeler 220, among other potential examples. In one instance, a test manager 215 can provide functionality for defining, selecting, and running a defined test (e.g., 235) against a service. The service can be embodied in the hardware (e.g., processors (e.g., 274), memory (e.g., 276), and interfaces (e.g., 278)) and software (e.g., application 280) of the one or more computing devices (e.g., 210) hosting the service. The test manager 215 can further include a test environment manager 240 that can be used to construct a test to invoke and include a number of instances of one or more types of virtual purpose-built devices using device modeler 220.

The device modeler 220 can include logic for developing and providing virtual, software-based versions of various and potentially multiple purpose-built devices (e.g., 105). The virtualized devices can be provided for use in a test of a service, for instance, to model the varying demands and load placed on the service by a real world collection of devices (e.g., 105) interoperating with the service (e.g., application 280). In one example, device modeler 220 can include a device model manager 242 that can select and manage the attributes of one or more device profiles 245 that have been selected for use in defining the virtual instances of one or more devices 105. Additional logic can be provided to facilitate the operability of these virtual instances such that they behave as realistic substitutes for the real-world versions of the devices 105. For instance, device modeler 220 can provide request-response modeling 244, push message modeling 246, request modeling 248, hardware service modeling 250, and business service modeling 252 blocks.

Request-response modeling 244 can define and utilize response models for each virtualized device instance to allow the virtualized device instance to provide realistic responses to real requests by the service under test, such that the responses mimic what would be expected by the actual device instances (e.g., 105). In such transactions, the device 105 acts as the server and the service acts as the client. For instance, the service may query devices to discover the status of certain elements or services provided by the client, such as the status of the battery of the device, the current operating mode of the device, etc. As such, the service may send a request to the device and expect a response according to a particular protocol and format. Further, the request-response transaction may be stateful or session-based, and the device would accordingly provide responses that are consist with the conversation between the device and service. Accordingly, request-response modeling 244 can cause each of the virtual instances of the devices to receive requests from the service and generate synthesized responses to the requests that are consistent with what the service would expect when interoperating with a real version of the device (e.g., 105).

Many purpose-built devices 105 do not wait for a request from a service before providing data. Accordingly, devices 105 may push data intermittently or according to a defined schedule. In some cases, devices 105 are "chatty" in that they frequently push data across a network connection (e.g., 110) to report information captured or sensed by the device. As an example, a device possessing a pedometer may send data at regular or irregular intervals to report a number of steps taken by the device's user and detected by the device. Push messages are commonly used by purpose-built devices 105 as the devices often possess limited computing and memory resources and offload the data collected by the device 105 to other computing devices (i.e., hosting the service) for storage and enhanced processing. However, because this data is pushed, the service receiving the data has less control over when this data is received. Indeed, it can be difficult to predict when this data will next be received from the device 105, however, the simplified and/or specially-purposed device 105 may be dependent on the service's ability to receive, collect, and process data pushed from the device 105. Push message modeling 246 can generate virtual push messages for each virtualized instance of a device 105. Push message modeling 246 can mimic the varied timing and content of messages that might be received from a collection of devices 105 concurrently interoperating with a service. Indeed, the messages may be dependent on activity at the device 105, such as the activity of the user or tool the device is monitoring or interoperating with. Accordingly, messages sent by the virtualized instances of the devices can be based on the modeled business services and hardware services performed at the device (and as modeled by hardware service modeling 250 and business service modeling 252).

Some messages generated by devices 105 are simply announcements or reports to the service. These unsolicited push messages may be sent without an expectation, by the device, of a response from the service. Other messages may be initiated by the device 105 as requests, or queries, of the service for which a response is expected. Accordingly, request modeling 248 can be provided to generate virtual requests as would be sent by a real-world device 105 and handle responses to the requests. For instance, additional requests or push messages may be sent by the device 105 in response to the responses received from the service. Accordingly, request modeling 248 can ensure that the virtualized versions of the device 105 behave as would be expected by the real world service under test.

A purpose-built device 105 can include one or more data processing apparatus 256, one or more memory elements 258, and device logic 260 for performing one or more specific functions or hosting one or more specific applications. Additional hardware can be provided on the device 105 including various sensors 262 and other elements, as well as a network adapter 264 to allow the device to send and/or receive communications using one or more communication technologies. For example, a device 105 may be provided with a network adapter 264 to allow the device to communicate with a host system 210 (e.g., a personal computer, smartphone, web server, etc.) over local and/or wide-area networks using technologies such as near field communications, Bluetooth, WiFi, cellular broadband data, and others. A device modeler 220 can generate device profiles 245 to model, not only the data sent from the device 105 (either as a push, or in response to a prompt by a service), but also to model the functionality of the device at the device, including its hardware and local services (also referred to herein as "business services") provided through the logic 260 and hardware of the device 105. Indeed, as noted above, the state of the hardware and services at the device level can affect the frequency, availability, and content of communications between the device 105 and other devices (e.g., host system 210).

Hardware service modeling 250, in some implementations, can model the hardware states of a given device, as defined by its device profile 245. Hardware states can change on the device and these changes can affect how the device 105 interacts with a service to be tested. As examples, a mobile device may possess a battery or other energy storage module, and that status of the battery can affect whether the device is on/off and thereby available, battery savings modes enforced at some devices may influence the frequency with which the device is able to transact with the service, and battery status may prompt alert messages to be sent by the device 105 (e.g., to inform a user at another device (e.g., host system 210) that the battery is low, among other examples. In another instance, the state of the device's memory (e.g., 258), the profile of the network adapter (e.g., 264), whether a sensor (e.g., 262) is turned on or activated, can all influence how and under what conditions the device 105 will interact with the service. For instance, in the case of the network adapter, the technology the device uses, how strong its signal is, the sensitivity of its antennae to incoming signals from other devices, and other characteristics can influence whether the device 105 will periodically re-send messages (e.g., in response to dropped packets), how quickly the device uses its battery life (e.g., defining a relationship with the modeled battery state of the device), among other aspects that will be relevant to modeling the device's 105 interaction with the service. Hardware service modeling 250 can also model hardware or other physical entities monitored and/or integrated with the computing components of the device. For instance, the physical entities monitored by the sensors (e.g., 262) of the device 105 can have physical characteristics and functions that influence when and how the device 105 communicates with the service to be tested. For instance, if the physical entity is powered off, is disabled, or has an error, etc., the device 105 can also pause any business services it might provide that lead to communications with the service, among other examples.

Business services of a device 105 can pertain to the functionality and features added by the device to enhance a physical entity. For instance, the business services of a smart watch can include a pedometer service, heartrate monitor, global positioning system, biometric tracker, among other examples. The business services can interoperate with a service provided by a remote host (e.g., 210), such as corresponding application downloadable onto a smartphone or tablet. Business services of a smart mattress can include tracking of sleep patterns and disruptions. Business services of a smart thermostat can include monitoring temperature of one or more rooms, monitoring when heating or air conditioning is turned on or off, etc., with the smart thermostat interoperating with a remote backend server that collects data describing energy usage and patterns at a home or office, among many other examples. The business service can perform tasks based on the physical actions and characteristics of an associated human entity. In this respect, the business service is dependent on the physical, or hardware, characteristics of the associated human entity. Accordingly, business service modeling 252 can model how the business service responds to these physical characteristics, as well as the business service actions that trigger an interaction with a remote service (i.e., the service to be tested). For instance, when the hardware of a heart rate monitor is turned on, it can sync to a corresponding host system, and begin sending data reporting the measured heart rate of a user (e.g., according to a particular frequency), among other illustrative examples.

Device profiles 245 can define the models for use by request-response modeling 244, push message modeling 246, request modeling 248, hardware service modeling 250, and business service modeling 252 in instantiating virtualized instances of a corresponding purpose-built device 105. In some implementations, each device profile can include models of a device's responses to a universe of potential requests by a service, models of the universe of the device's potential push messages and requests (and the conditions for these messages), models of the hardware states of the device and business service states of the device, as well as models defining how these states affect the hardware and the communication behavior of the device. Device profiles can be assembled from a common library of selectable hardware and business service characteristics and actions that have relevance to the device's interactions with services to be tested.

In some implementations, a test environment server 225 can be used in connection with testing system 205 to instantiate virtual instances of a device based on device profiles 245. In one example, test environment service 225 can include one or more data processing apparatus 266, one or more memory elements 268, and components implemented in hardware and/or software-based logic. A test environment server 225, for instance, may generate virtual environments 270 (e.g., through a virtual machine manager (VMM), hypervisor, or other utility) to construct an operating environment in which the device instance is virtualized. A test system interface 272 can be provided through which the virtualized device instance is driven by the device modeler 220 (based on device profiles 245) to act as a real instance of the device 105 would (i.e., as modeled by the corresponding device profile 245).

A device profile builder 252 can be provided to serve as a reusable platform for developing and editing device profiles 245 for potentially limitless varieties of purpose-built devices 105. Device profile builder 252 can also utilize transaction data 254 collected from monitoring real-life traffic between an instance of the device 105 and a version of the service, to build the models used in the device profiles. For instance, the service can be instrumented using one or more agents (e.g., 255) with functionality for intercepting inbound and outbound communications of the host system (and service) with a device. These intercepted communications can be identified (together with conversations, sessions, and other information) to build transaction data 254, among other examples. Some models and model aspects of the device profiles 245 can be based on human inputs or through automatically parsing text of related device specifications, among other sources of information.

As noted above, device profile models can be based on observed transactions between a device and a service. A transaction can include one or more requests and corresponding responses to the requests. The request can be initiated by either the device or the service. Transactions can embody a push message from the device and the service's processing of the push message. Transaction data can describe the requests/pushes and any corresponding responses. Such transaction data can be based on recorded instances of the transactions. Such instances can be monitored and recorded and include recorded real world transaction instances as well as recorded test transaction instances involving the component(s) (e.g., the devices) to be modeled. Alternatively, transaction data can be user-defined or otherwise derived to describe desired, idealized, predicted, or hypothetical responses of a particular component to various types of requests in various types of transactions. In some instances, such transaction data can be derived by identifying expected behavior of a particular component from specification data, log files, Web Services Description Language (WSDL) or Web Application Description Language (WADL) descriptions, or other structured or unstructured data describing the component's responses to various types of requests and other functionality and behavior of the component in transactions of particular types. Regardless of how the transaction data is generated, the transaction data can be processed to identify patterns and behaviors relating to how one component responds to particular messages received from other components. Transaction data can describe requests and corresponding responses, together with attributes of the respective requests and responses. In some cases, requests and responses can be transmitted between components over one or more networks (e.g., 130), among other examples.

Transaction data (e.g., 254) describing transactions that involve a request and a corresponding response can describe request-response pairs within transactions, including attributes of the requests and responses such as the values included in the requests and responses, timing of the requests and responses, the transport details regarding how the requests and responses are communicated between components, among other examples. Transaction data (e.g., 254) can further describe one or more characteristics associated with the activity and/or the context in which that activity occurs. For instance, transaction data can be generated to describe monitored transactions. Transaction data can include information collected by the monitoring components (e.g., agents 255) describing characteristics observed by the monitoring component including information beyond the attributes and content of the recorded pushes, requests, and responses messages themselves, such as information concerning the context or environment in which the recording takes place. Transaction data (e.g., 254) can include, for example, a frame identifier, which identifies a message in a transaction; a parent identifier, which identifies the requester that generated the request sent to the component or sub-component monitored by the agent; a transaction identifier, identifying the transaction, with respect to the component or sub-component being monitored; and an identifier that identifies the monitoring component that captured or generated the monitoring data, among other examples. Characteristics can further include other information describing the message or transaction such as a system clock value, current processor and/or memory usage, contents of the request, contents of the response to the request, identity of the requester that generated the request, identity of the responder generating the response to the request, Java virtual machine (JVM) statistics, structured query language (SQL) queries (SQLs), number of database rows returned in a response, logging information (e.g., messages logged in response to a request and/or response), error messages, session identifiers, database connection identifiers, simple object access protocol (SOAP) requests, other values generated by the monitored component that are not provided in the request or the response, web service invocations, EJB method invocations, EJB entity lifecycle events, heap sizing, and the so on. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, among other examples.

Models of pushes, requests, and responses included in device profiles 245 can be based on transaction data and can be used to generate synthetic messages as would be sent from a device 105. For instance, a service can attempt to interact with the actual device and virtualization logic (e.g., in testing system 205 or test environment server 225) can intercept the service's request and cause it to be handled by a virtualized instance of the device. For instance, the device's device profile 245 can be used to identify respective transactions (e.g., request-response pairs) that correspond to a request of that type and having similar attributes values or types. The device profile 245 can further describe characteristics of the transactions. Such information can include timing information identifying time thresholds or limits at which particular requests and/or responses are detected or sent (e.g., in order to identify the delay between when the request was detected and/or sent and when the associated response was detected and/or sent), and the like. Virtualized instances of the device instantiated from the device profiles 245 can embody these performance characteristics captured or defined in the service model, including message size and format, response times/delays, network bandwidth characteristics, etc.

In one example, models within a device profile 245 can identify and describe requests and responses in each of a variety of different protocols as well as the pertinent information from each. Thus, device profiles 245 can include configuration information identifying the basic structure of requests and responses for each of several supported communication protocols. Depending upon the protocol in use, for instance, requests can take the form of method calls to an object, queue and topic-type messages (e.g., such as those used in Java messaging service (JMS)), requests to access one or more web pages or web services, database queries (e.g., to a structured query language (SQL) or Java database connectivity (JDBC) application programming interface (API)), packets or other communications being sent to a network socket, and the like. Similarly, responses can include values generated by invoking a method of an object, responsive messages, web pages, data, state values (e.g., true or false), and the like.

Virtual instances of devices can simulate the behavior, data and performance characteristics of a device and stand-in for the device in connection with development and testing efforts of a service. These virtualized versions of the devices, generally, can provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Virtualized instances of the devices can be invoked and executed in a virtual environment implemented, for instance, within on-premise computing environments, agents, in private and public cloud-based lab, using virtual machines, traditional operating systems, and other environments, among other examples.

In some implementations, response virtualization can involve comparing new requests generated by a requesting service to the request information stored in a corresponding device profile model. For example, if a new request containing a particular command and attributes is received, the model can be searched for a matching request that contains the same command and attribute. If a matching request is found, the virtualization process returns the response (as identified by information stored in the device profile model) associated with the matching request to the requester.

In many situations, the requests provided to a virtualized device will not be exactly the same (i.e., containing the same request as well as the same attribute(s)) as the requests identified in device profile model. For example, a request provided to the corresponding a virtual device instance may contain the same request but a different attribute or set of attributes. The corresponding device profile can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

In some implementations, a device profile model can further include information facilitating the use of request sensitive values to be included in responses generated by the virtual device instance using the device profile. A request sensitive value can link an attribute included in the request to a value to be included in the response. For example, response information in a device profile can indicate that a particular request attribute be used as the basis of a particular attribute of the response to be returned in response to the request. Accordingly, responses generated by the virtualized device instance will include the value indicated by the request sensitive value. As an example, if the information describing a known transaction of type A indicates that the request includes the string "UserID" as the first request attribute and that the corresponding response includes the string "UserID" as its second response attribute, a request sensitive value specifying "[REQUEST ATT 1]" (first request attribute) can be generated for the second response attribute in the service model, among many other potential examples, including more complex examples with more complex dependencies defined in the service model between certain request attribute and request sensitive response attributes.

Device profile models modeling the communication behavior of a device can model still additional features in some implementations. For example, a device profile model can link the content and form of communications from the device to hardware and business service activity at the device. Accordingly, pushes, requests, and responses to be generated by a virtualized device instance can be based on outcomes modeled in hardware service models and/or business service models of the device profile 245, among other examples.

Monitoring components can monitor and report characteristics independently for each transaction in which the monitored service or service component participates. In addition to monitoring the performance of a service and aggregating information about that service over a multitude of transactions (such that information about the performance of individual transactions can, for example, be averaged, based upon the observed performance of the component over the course of performing the multitude of transactions), monitoring service can additionally detect characteristics of the devices that interact with it as well as the types, conditions, and characteristics of the messages of the devices.

Monitoring components, such as agents (e.g., 255) can be instrumented on one or more of the service components (e.g., application 280) involved in a transaction. In some implementations, an agent manager can interface with one or more agents (e.g., 255) instrumented in virtual machines, applications, or software components, such as software components involved in transactions involving a Java-based system, database, .NET-based system, or other system or component, to collect and assemble transaction data. For example, in some implementations, agents can include functionality similar to functionality described, for instance, in U.S. patent application Ser. No. 11/328,510, titled "Instrumentation System and Method for Testing Software," filed Jan. 9, 2006, which is hereby incorporated by reference in its entirety as if completely and fully set forth herein. Agents can capture data as it enters or exits the software component including data describing method calls and other requests, and corresponding responses, that are exchanged between the instrumented software component(s) and other components. Agents can be used, for instance, to capture transactions between an application 280 and a device 105. Not only can agents capture the contents of requests and responses, but agents can also capture context data, such as session data, connection data, timing data, and other information that can be used to associate various requests and responses together. Agents can inspect the internal data of a service component upon which it is implemented and such internal data can also be reported as context data. Such context information can be further used to identify correlations between multiple transactions.

In some cases, instrumentation agents (e.g., 255), or agents, can be software-implemented agents that are configured to provide visibility into the operations of each instrumented component to one or more agent managers provided in connection with a virtualization system. Each instrumentation agent (e.g., 255) can be configured to detect requests and responses being sent to and from the component in which that agent is embedded. Each agent can be configured to generate information about the detected requests and/or responses and to report that information to an agent manager within, coupled to, or otherwise associated with a testing system 205. Additionally, each agent can be configured to detect and report on activity that occurs internally to the component in which the agent is embedded.

In some cases, there may be a single instrumentation agent per service component, while other embodiments may be implemented differently. For example, in some systems, there can be a one-to-one correspondence between the number of instrumentation agents within a component and the number of processes (or other subcomponents) to be monitored within that component. In such embodiments, each instrumentation agent monitors and reports on its corresponding sub-component. In other instances, a single agent can monitor and have visibility into multiple components (e.g., a single agent on a host device), among other examples.

In some cases, agents and other monitoring components can be provided with functionality for tagging data of a request or response monitored by the agent before it exits or enters the component it monitors, the tag identifying a particular session or transaction to which the request or response and corresponding characteristic information belongs. After being sorted, the frames can be arranged in ascending or descending order, for instance, using timing information, inserted tag data, or other information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing or other flow information. Additionally, a flow can be identified by identifying the requester/responder, parent/child relationships of each portion of the business transaction, among other information.

Agents can also identify the type of transaction. For instance, an agent can identify an outgoing request by a service and identify the corresponding response by the device. In other instances, the agent may identify an incoming message from the device and determine that the message does not correspond to a request of the service and is a push message (or request) by the device. Patterns can be identified in messages sent from the device(s) to allow the agent (or agent manager processing data collected by the agent(s)) to distinguish a push message from a response by the device to an earlier request (e.g., in the event a push message is received from the device following a service's request, but before the device's response to the request). In other instances, a push message from a device will be identifiable in that no corresponding requests are outstanding that involve the device, among other examples.

Figure 3:
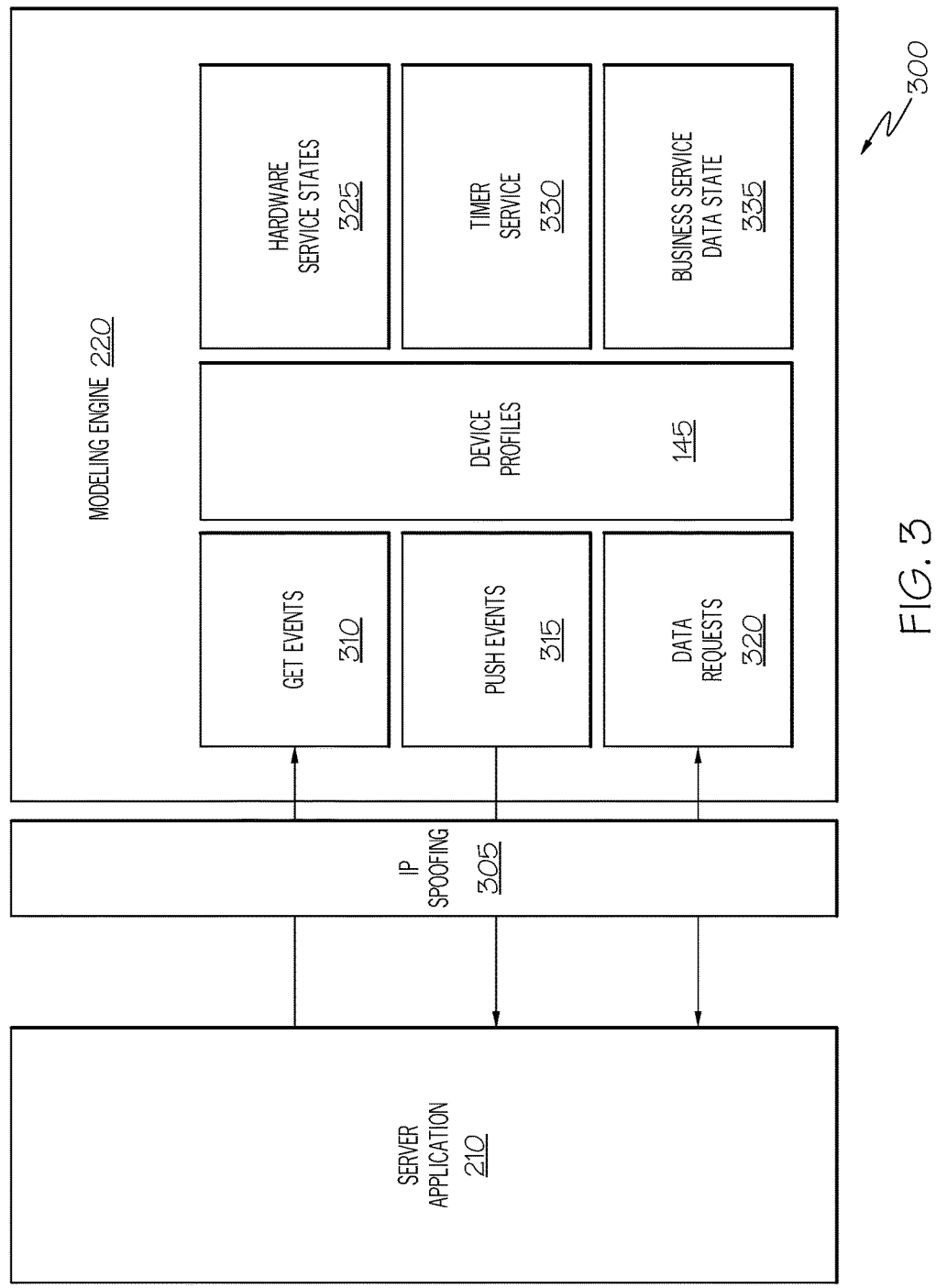
FIG. 3 is a simplified block diagram illustrating example elements of a virtual device instance in accordance with at least one embodiment.

Turning to FIG. 3, a simplified block diagram 300 is shown illustrating example functionality and components of an example implementation of a virtualized instance of a device. A device modeler (or modeling engine) 220 can provide the logic for modeling the functionality of an instance of a purpose-built device for purposes of allowing a service (e.g., 210) to interact with a simulated version of the device. A network connection between the device and service can be simulated using IP spoofing 305 or another technique, allowing the service to believe that it is actually connected to and communicating with the device over the expected technology (e.g., Bluetooth, WiFi, etc.) and expected protocol (e.g., IP). As an example, IP spoofing can be performed by generating a set of different virtual IP addresses, each of which can be assigned to each virtual version of a device and cause communications from other systems and software interacting with the virtual versions of the devices to be routed to a testing system for consumption by the respective virtual instance of the device. Similarly, communications from the virtual device instance can be sent from the corresponding virtual IP address, among other examples. In some implementations, a firewall appliance can be programmed for use in modifying packet headers such that the packets from different virtual device instances appear to be from different IP addresses and, thus, different physical machines. A device profile 145 can embody one or more models for generating simulated responses and push messages by the device and sending these over the spoofed network interface (e.g., 305).

The service 210 can interact with the virtual device instance, for instance, by sending get messages (e.g., 310), receiving push messages (e.g., 315), and participating in request/responses transactions (e.g., 320). Request/responses transaction can be initiated by a request by either the service or the virtual device instance, with the contribution of the device being modeled and simulated by the virtualized device instance. A push message, request, or response to a service request by the virtualized device instance can be dependent on the activities that the real-world device would be performing. Accordingly, the virtualized device instance can model the messages it sends based on hardware and business service modeling of the corresponding device. For instance, the virtualized device instance can model one or more hardware service states 325 and transitions between the states. Hardware service states can relate to the state of computing hardware elements of the device, such as memory capacity, the power state of the computing elements, whether the network adapter is enabled, the capacity of the battery powering the data processing apparatus of the device, etc. Hardware service states 325 can further relate to physical events monitored by the device and the device profile can model the occurrence of these physical events. Such events, or state changes, can prompt the device to send one or more messages to a service and/or drive the content of messages sent from the device to the service, among other examples.

Business service states 335 can pertain to the logic that utilizes data received from the service or gathered at the device by sensors or other device elements to provide certain services or outcomes. For instance, as a simplified example, a pedometer device may have one or more sensors that detects human movement events, but the logic of the device may determine whether the movements correspond to human steps, organize this information, present it on a simplified user interface of the and cause the information to be provided to a service (e.g., hosted on a smartphone paired to the device), which can further process the information and even return other information to the device that relates to the counted steps, among a myriad of other example devices and applications. In this example, business service states may include a state where steps are being calculated (e.g., based on a sensor indicating that the device is being worn and is in movement), a sleep monitoring state, a data communication state (e.g., including sub-states of initializing a connection with a service, receiving data, sending data, etc.), a hibernation state, a time-keeping state, etc. Depending on the business service state of the device, the device may or may not be sending (or receiving) data, will send certain types of data, may be using or more less of its battery, processing, or memory capacity, among other examples that will affect how (and whether) the device will interact with the service. Accordingly, modeling data transmitted from the device can be dependent on the business service data state 335 and/or the hardware service state 325 of the device.

The states (e.g., 325, 335) of the device can change while in operation. These changes may be gradual (e.g., battery and memory use, progression of physical events monitored by the device, progression of the stamina or health of the physical entity (e.g., tool or living entity)) or quantized in that the state transitions abruptly between a set number of states, among other examples. These transitions can occur temporally. Accordingly, timer services 330 can be maintained during the virtualization of a device instance and the time services 330 can define the rate, frequency, and timings of the state transitions to be modeled in the virtualized device instance.

As an illustrative example, a device may be designed to monitor performance of certain activities by an industrial or household tool. Hardware service states can correspond to hardware actuators or other sensors being engaged to detect these activities. Business service states can determine, from the sensors, that the event has occurred and handle reporting of the event. Hardware service states can also pertain to the hardware that allows the device to function, such as the device's battery. Correspondingly, additional business service states can detect when a device's battery is below a certain level and trigger a reporting event to notify a user that the battery needs to be replaced or recharged. The device profile can further how the various activities performed by the device and its elements affect the battery life. For instance, the initial battery capacity of the device and a baseline energy usage rate can be defined together with other energy usage rates for certain more-resource-intensive activities. For instance, the device may use relatively more energy when transmitting event messages to a service. Accordingly, if the device profile defines a hardware service model that has a more frequent pattern of physical events occurring, this can cause more report messages to be sent by the modeled device (as defined in a business service model of the device profile), causing the modeled battery capacity to degrade quicker than if fewer events (and push messages) were being generated. Further, while the simulated messages that would be transmitted from a corresponding virtualized device instance may be relatively high during the first portion of a corresponding test, the degradation of the battery may cause the device to enter an inactive period later in the virtualization, based on the device profile models, corresponding to a dead battery or battery preservation mode, among other examples.

Figure 4A:
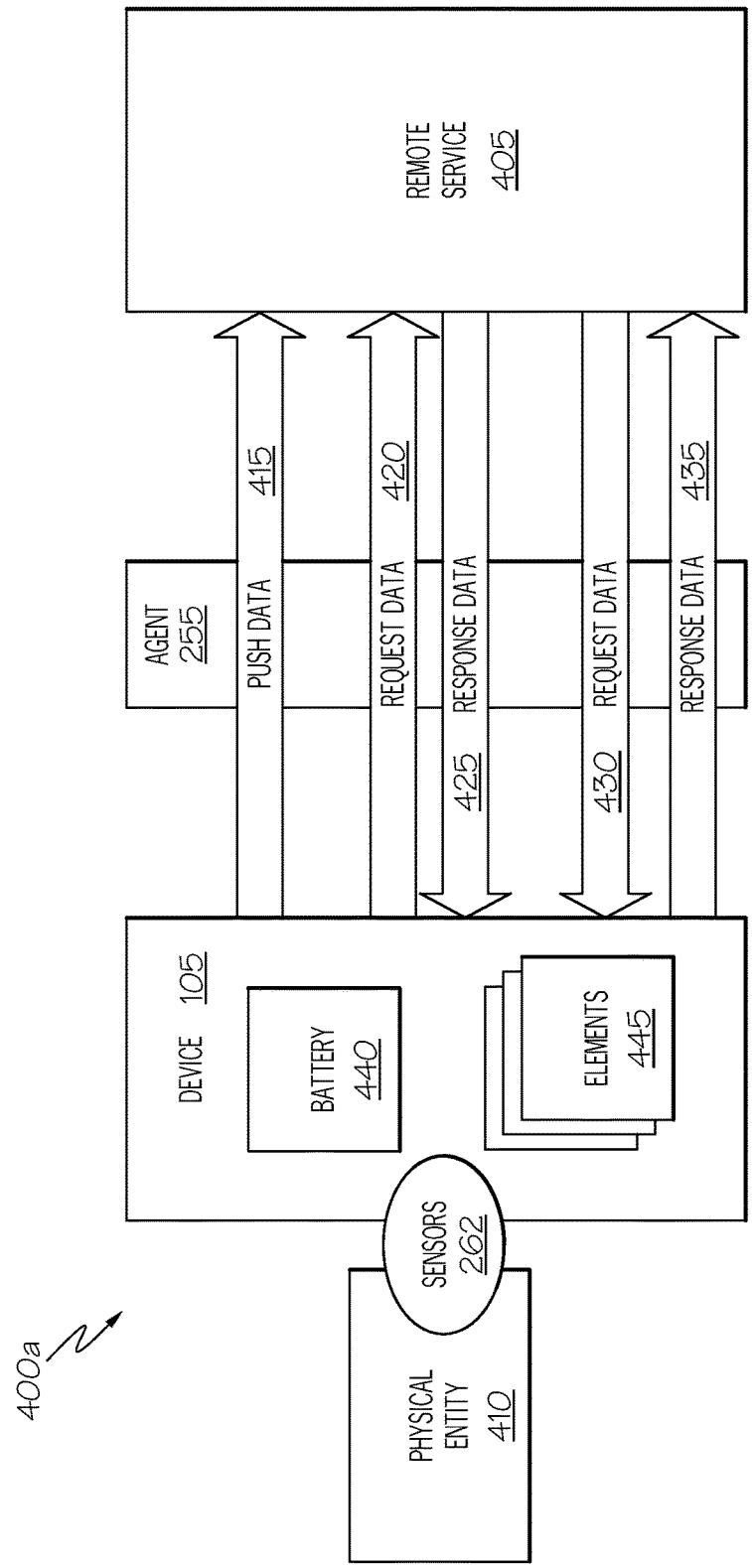
FIG. 4A is a simplified block diagram illustrating example interactions between a purpose-built device and a service in accordance with at least one embodiment.

Turning to FIG. 4A, a simplified block diagram 400a is shown illustrating traditional, real-world interaction between a service 405 and a real-world device 105 integrated with, monitoring, or otherwise associated with a physical entity 410. Various communications may take place, as noted above, including pushed messages 415, request 420 generated by the device, and corresponding responses 425 by the service 405, as well as requests 430 by the service 405 and corresponding responses 435 of the device. Transmissions (e.g., 415, 420, 430) may correspond to events or state changes detected or generated by the device 105 using one or more hardware or software elements 445, sensors 262 monitoring aspects of the physical entity 410, and even pertaining to the health of the device 105 itself, such as its battery 440, among other examples. In some implementations, one or more agents 255 can be used to record these real-world communications to generate transaction data for use in developing one or more models to be included in a device profile corresponding to the device 105. The agent 255, in some instances, may be instrumented on the service's 405 interfaces to capture all in- and outbound traffic involving the service e 405 and device 105. In other instances, the agent 255 can be inserted between the service 405 and device 105 and within their communication path. In still other implementations, an agent can be provided on the device 105. The agent 255, depending upon its implementation and where it is instrumented, can also have visibility into either the service or device and observe conditions and internal processes, threads, events, and behaviors reactive to or proceeding certain communication events (e.g., 415, 420, 425, 430, 435). Such observations can also be used in generated a device profile, including models of hardware and business service models of the device 105.

FIG. 4B is another simplified block diagram 400b showing that the device 105 (and its physical entity 410) can be replaced by a virtualized instance of the device embodied, in this particular example illustration, as a device model 455 instantiated within a virtual machine 460. In this example, a testing system 205 including a device modeler, can drive (e.g., through communications 465) the behavior of the device model 455 based on a device profile generated for the device 105 (and associated physical entity 410). In some implementations, agents (e.g., 255) can be used during the virtualization, with the agents 255 collecting information and context from the service 405 to assist in informing (e.g., at 470) the testing system 205 how to accurately simulate the device's reactions to the service 405. In other instances, an agent 255 can be used by the testing system 205 to implement the virtualized device instance itself, with the agent intercepting communications of the service, corresponding with the testing system, and returning data spoofed to appear as though from the device in accordance with instructions received from the testing system (based on the corresponding device profile models).

Figures 5A, 5B:
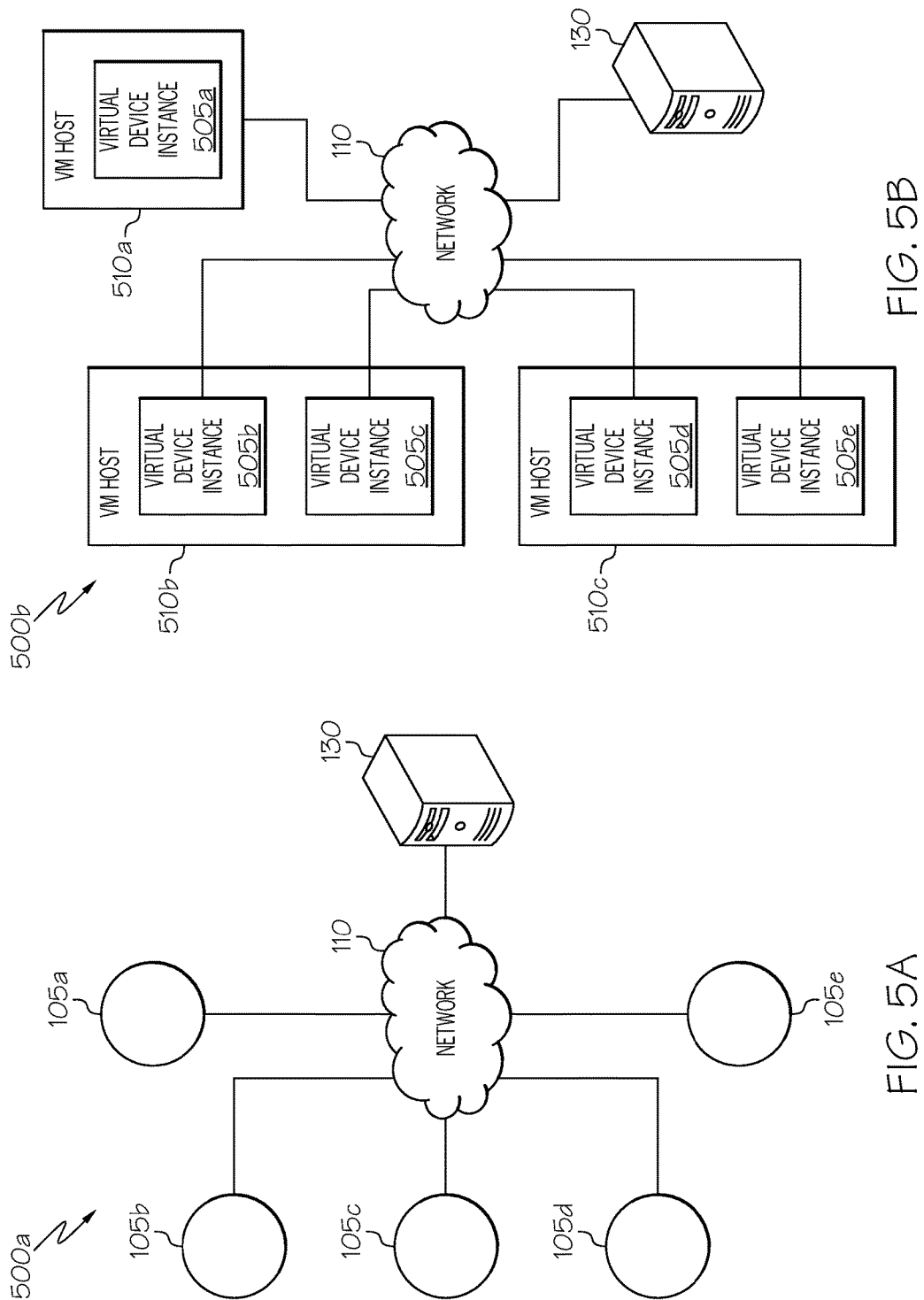
FIG. 5A is a simplified block diagram illustrating example interactions between a multiple purpose-built device and a service in accordance with at least one embodiment.
FIG. 5B is a simplified block diagram illustrating replacement of each of the purpose-built devices of FIG. 5A with corresponding virtual device instances in accordance with at least one embodiment.

As shown in FIG. 5A, a service hosted by one or more host devices (e.g., 130) can interface with multiple purpose-driven devices (e.g., 105a-e) concurrently in multiple sessions. The devices may be multiple instances of the same device or device type, or may be a set of devices that include multiple different types of devices. The service may maintain dedicated, concurrent sessions with each of the devices 105a-e. In other instances, the multiple devices 105a-e may be sharing in a single session with the service. In still other examples, multiple sessions may be supported by the service with two or more of the devices sharing one of the sessions, among other examples. Indeed, a service may aim to accommodate complex combinations of devices and potentially large loads involving multiple devices and/or sessions. However, developing tests of such complex scenarios can be difficult, were actual real-world instances of the devices (and their associated physical entities) to be provided each time a version of the service were to be tested during its development lifecycle. Accordingly, the virtualization platform described herein can be used, as shown in FIG. 5B, to virtualize the various combinations of devices that may be interacting with a service in a given scenario. Multiple such scenarios may be constructed using the platform to test the service's operability and performance in each of these scenarios. Further, multiple different services can re-use the same platform for tests that involve their own use cases and interoperating devices.

Figure 6A:
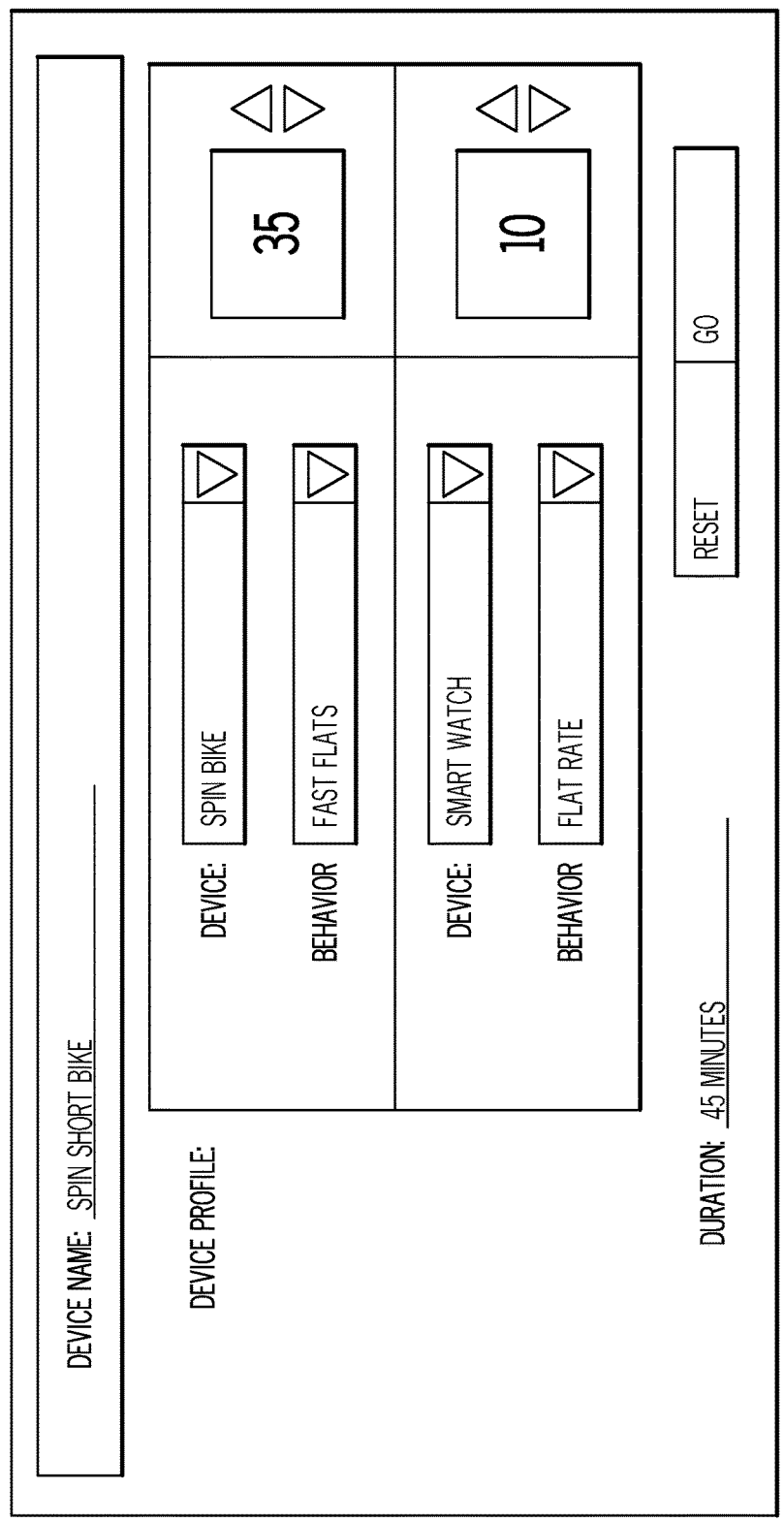

As shown in FIG. 5B, virtual device instances 505a-e can be provided (e.g., by a testing system or other system hosting a device modeler) and can be implemented, for instance, on one or more platforms, such as agents or, as shown in this example, virtual machine hosts 510a-c. Each virtual machine host 510a-c can potentially host two or more virtual device instances (e.g., 505a-e) (e.g., through a virtual device server hosted on a particular virtual machine host). The virtual device instances 505a-e may, in some cases, not only "virtualize" the devices 105a-e, but may also virtualize physical entities associated with the devices (e.g., a tool, system, human or animal wearer of the device, etc.). The service can then interact with the virtual device instances 505a-e as if these were the devices themselves, allowing the service to be tested and validated in various use cases involving varying combinations and profiles of devices. In one alternative example, a firewall appliance could also be used to modify headers of the FIGS. 6A-6C are simplified screenshots of graphical user interfaces that may be provided in some implementations of a testing system and/or device modeler. These screenshots can correspond to a particular illustrative use cases presented here as a non-limiting example of a device profile for use in providing a virtualized instance of a purpose-built device. For instance, FIG. 6A is a screenshot 600a of a testing system providing an interface for a user to define a set or subset of devices to be virtualized in connection with a test of a service. In this particular illustrative example, the service is to host a game that allows human participants to compete against one another in a fitness class, such as through a spin bike session. Each of the spin bikes is instrumented with a purpose-built device to track the performance of the bike's rider (e.g., how fast the bike is being pedaled and at what intensity, etc.). The example spin bike monitors can also register each participating device in a "racing session" hosted by the service. In connection with the race, the spin bike monitors can transmit data reporting the performance of the rider to the service. Other devices can also connect to the service within the racing session, including wireless heartrate monitors worn by users in the race. In some cases, the heartrate monitors may connect to the service through the spin bike monitors. The service can set up the race, determine which spin bikes are going to be participating in the race, and receive transmissions from each of the bikes' monitor devices reporting the respective performance of each bike's rider. The service can assess which riders is riding the fastest, covering the most distance, burning the most calories, or best meeting an established goal of the race, and can present the rankings and status of each rider, dynamically and in real time, on a video board, to give the riders an indication of their status.

The developers of the service in this example may desire to test the service during development to see if the service functions as intended. As the service may be utilized in a variety of different ways, a variety of test cases may be desired to see how the service responds (e.g., some races may be solo races against a computer opponents, some races may involve races connected remotely over the Internet, some races may have dozens of racers participating, others may have hundreds (or even thousands), etc.). However, to test each of the cases using real versions of the spin bikes integrated with the purpose-built monitor devices, it would be impractical to schedule a variety of sessions where real life users of varying combinations of skill levels, etc. gather to simulate conditions of the test case on live spin bikes. Accordingly, the virtualization platform, described above, can be utilized to develop device profiles for each of the spin bike monitor devices that are compatible with the service, heart rate monitors also supported, and any other devices that the service is designed to interoperate with. From these device profiles, virtual instances of these combinations of devices can be developed and run to simulate a variety of different test cases.

Returning to FIG. 6A, the GUI of screenshot 600a allows a user to select a number of devices that are to be virtualized in a given test case, along with the characteristics of the associated physical entity (i.e., the human rider). For instance, in this simplified example, a test administrator-user can select to instantiate 35 virtual instances of a spin bike that includes a monitor that is to report to the service in accordance with a simulated user driving the bike in accordance with a "Fast flats" profile (e.g., where the spin bike is ridden to mimic racing on a flat terrain). In other implementations, some spin bikes could be set to different behaviors than other spin bikes that are also to be virtualized in a test. In the example of FIG. 6A, a user further designates that 10 instances of a smart heart monitor watch are also to be instantiated in the test session to interact with the service concurrently with the 35 spin bike monitors. Further, a duration and other characteristics of the test can be selected and defined. Devices, behaviors, and other characteristics can be pre-defined and can represent re-usable building blocks from which other test scenarios can be built.

Turning to FIG. 6B, another screenshot 600b is shown of an example GUI that can be used to define, modify, or fine tune aspects of the device profile of one of the devices to be instantiated in a given test scenario. In this simplified example, the GUI permits a user to define features of the spin bike monitor device profile. For instance, a user can select the communication technology that is to be used in the virtualization (e.g., WiFi or Bluetooth) consistent with what would be used by the real world version of the device. Additionally, the initial capacity of the device's battery (e.g., 8000 mAh) and the baseline battery usage rate (e.g., 1%/10 mins) can be defined. Further, a user can select the get events that will be modeled in the virtualized instances of the spin bike monitor, as well as the push events, and responses to various data requests. For instance, no get events are to be modeled, but a variety of push messages are to be modeled. Specifically, the virtual instance of the spin bike monitor is to mimic real spin bike monitors by sending push events every 2 seconds for the current revolutions per minute (RPM) detected at the spin bike, the watts of work performed by the simulated user of the spin bike, and the distance traveled, as determined by the spin bike monitor. The values of these push messages can be dependent on the behavior (or hardware service) models defined for the bike's user. Indeed, models can be provided for each of the push events. Included in the models is the amount of battery power that is used by each of the push events (e.g., pushing a watts reporting event "costs" 4 mAh, Distance messages 6 mAh, etc.).

Data Requests, in this example, indicate the types of requests that the service will be sending to the devices, which the devices are to generate responses to. The responses to each of the request types can be based on a request-response transaction model (or "service model") corresponding to requests of that type. Accordingly, selecting the checkbox next to any of the data request types can enable a corresponding service model. In this example, the service may send queries to each of the virtualized device instances requesting whether the spin bike monitor is turned on, how much battery capacity remains, and whether the monitor detects that it's spin bike's wheel is in motion, among other potential examples. The device profile models can be used to generate believable responses should any of these requests actually be received during the test scenario.

Turning to FIG. 6C, GUIs can allow an administrator to define other aspects of one or more of the virtual device instances that are to be instantiated in a given test scenario. In the example of FIG. 6C, a GUI can be provided to allow a user to define the simulated behavior of the physical entity associated with the device. In this case, the model for a simulated rider of a given spin bike instance can be adjusted. For instance, the RPMs, watts, and distances can be defined in the model to embody a range of values according to a defined statistical distribution over the time period of the test. For instance, the Fast flats behavior profile can provide for measured RPM values to be simulated and reported that span 87-100 RPMs within a bell curve distribution+/−2 standard deviations. In the case of watts, the distribution can be selected to be random between the values 300 and 340 during the test, among other examples. A rider may interact with other functions of the spin bike, such as the backlight of a display of the spin bike. Such actions can affect battery of the real-world spin bike (and integrated monitor device) and thus, indirectly, influence the ability of the device to communicate with the service to be tested (e.g., more frequent use of the light can affect battery life and shorten the device's participation in a session with the service, etc.). Accordingly, the behavior model can also define a model for these actions, such as the duration and frequency at which the light is turned on and the power effect of these actions, among other examples and corresponding models. The behavior profile can drive the values included in the virtualized push messages and responses generated by the virtualized instances of the device. Indeed, the virtualized communications can be related to, and in some cases dependent on, the device-level modeling facilitated through a corresponding device profile and device modeling logic.

It should be appreciated that the examples of FIGS. 6A-6C, are simplified examples and may only represent a partial implementation of the device profile. Indeed, other GUIs can be provided to allow other models of the device profile (or other aspects of the models not shown in FIGS. 6A-6C) to be adjusted and defined in connection with a test. Further, while these screenshots 600a-c pertained to the specific example of spin bike monitor devices and spin bike game service, the same device modeling platform (and same GUI platform) can be provided to allow a user to select other devices from a library of device profiles for virtualization in a test, as well as fine tune various attributes of these profiles. Further, GUIs can be provided to allow users to define at least portions of a new device profile from scratch. Thus, the logic and tools of the device modeling platform described herein, provides flexibility to allow for any number and variety of different purpose-built devices to be modeled such that virtual instances of the devices can be instantiated to interact with a real-world software service, e.g., in connection with the testing and development of the service.

Figure 7A:
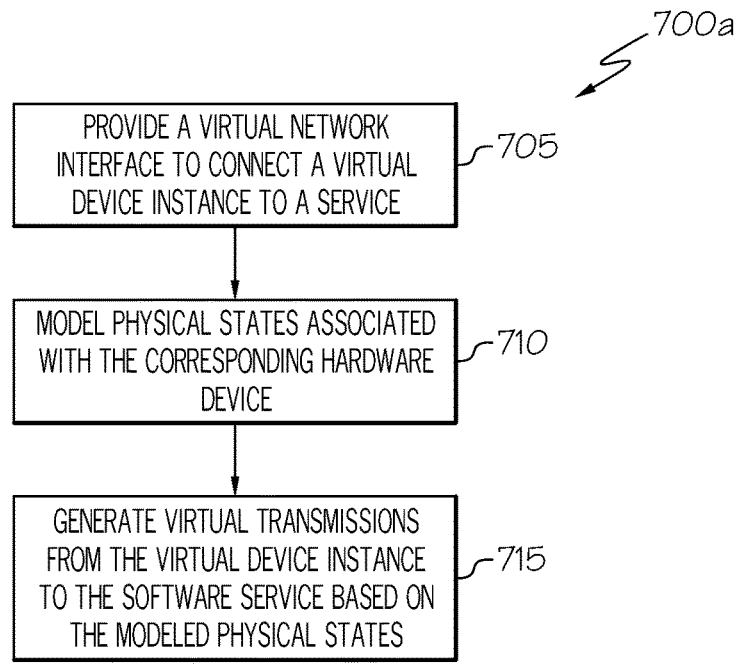
FIGS. 7A-7B are simplified flowcharts illustrating example techniques in connection with virtualization of purpose-built devices in accordance with at least one embodiment.
Figure 7B:
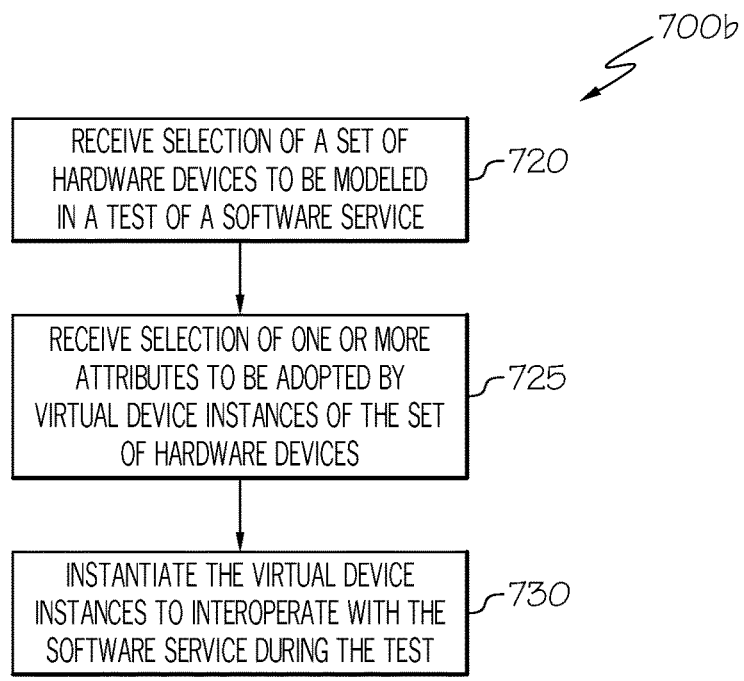

Turning to FIGS. 7A-7B, flowcharts 700a-b are shown illustrating example techniques for virtualizing purpose-built devices of varying types. For instance, in FIG. 7A, a virtual device instance can be generated, or instantiated, for a corresponding purpose-built device. The virtual device instance can be based on a device profile including one or more models describing operations and communications of the device. One or more of the models can be generated from transaction data describing observed operations and/or communications of the device and/or a software service that is to interoperate with the device. A virtual network interface can be provided 705 to spoof a connection with the device that is to be simulated using virtual device instance. The software service can send and receive data to/from the device through the virtual network interface. Physical states of the hardware device and/or a physical entity associated with the hardware device can be modeled 710. Virtual transmissions can be generated 715 and sent to the software service based on the modeled physical states. The virtual transmissions can be sent to the software service using the virtual network interface. The virtual transmissions can include push messages, requests, and/or responses to requests received at the virtual device instance from the software service.

FIG. 7B is a flowchart 700b illustrating example techniques associated with launching virtual device instances in connection with a test of a software service. A selection of a set of hardware devices can be received 720 (e.g., by a user through a GUI) that are to be modeled during the test. Device profiles can be identified for each of the selected hardware devices. A selection of attributes to be adopted by the virtual device instance can be received 725 (e.g., through the GUI). A device profile can include multiple models for use in accurately simulating the behavior of the device. A device profile can define alternate versions, behaviors, or characteristics of the device. The selected attributes can correspond to particular ones of the alternate versions, behavioral profiles, hardware profiles, etc. of the device and cause the same to be applied in a particular virtual device instance. The virtual device instances can be instantiated 730 to interoperate with the software service during the test. A test system can monitor the performance of the software service in connection with its interoperation with the instantiated set of virtual device instances.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
generating a virtual instance of a hardware device from device profile model data, wherein the virtual instance of the hardware device is to simulate operation of the hardware device, the operation of the hardware device comprises monitoring a physical entity, and the simulated operation comprises:
interacting with a software service over a network connection, wherein the interaction comprises:
generating, at the virtual instance, message data to push to a host of the software service over the network connection;
receiving request data from the software service over the network connection;
generating a simulated response to the request data; and
sending the simulated response from the virtual instance to the host over the network connection; and
modeling a physical effect of the physical entity measured by the hardware device, wherein data sent by the virtual instance during the interaction is based on the modeled physical effect.

2. The method of claim 1, wherein subsequent consumption of the software service is based on the physical effect.

3. The method of claim 1, wherein the hardware device comprises a mobile, battery-powered device and the physical effect comprises consumption of a battery by the hardware device.

4. The method of claim 3, wherein the device profile model data defines a relationship between an action performed by the hardware device corresponding to consumption of the software service and an amount of battery life expended based on the action.

5. The method of claim 4, wherein the action comprises sending data from the hardware device to the host.

6. The method of claim 4, wherein the action comprises an operating mode of the hardware device.

7. The method of claim 3, wherein the virtual instance is to simulate unavailability of the hardware device in the interaction upon modeling insufficient battery life.

8. The method of claim 1, wherein the physical effect comprises consumption of computer memory associated with the hardware device.

9. The method of claim 1, wherein the physical effect corresponds to events, to be detected by the hardware device, of a physical entity associated with the hardware device.

10. The method of claim 9, wherein the device profile model data defines a model of occurrences of the events of the physical entity.

11. The method of claim 9, wherein the physical entity comprises a physical product monitored by or integrated with the hardware device.

12. The method of claim 9, wherein the physical entity comprises a living entity.

13. The method of claim 1, wherein the simulated response is generated based on a request-response model based on prior monitored transactions involving a version of the software service and an instance of the hardware device.

14. A computer program product comprising a non-transitory computer readable storage medium comprising computer readable program code embodied therewith, the computer readable program code comprising:
   computer readable program code configured to generate a virtual instance of a hardware device from device profile model data, wherein the virtual instance of the hardware device is to simulate operation of the hardware device, the operation of the hardware device comprises monitoring a physical entity, and the simulated operation comprises:
      interacting with a software service over a network connection, wherein the interaction comprises:
         generating, at the virtual instance, message data to push to a host of the software service over the network connection;
         receiving request data from the software service over the network connection; and
         generating a simulated response to the request data;
         sending the simulated response from the virtual instance to the host over the network connection; and
      modeling a physical effect of the physical entity measured by the hardware device, wherein data sent by the virtual instance during the interaction is based on the modeled physical effect.

15. A method comprising:
   receiving, through a graphical user interface, selection of a set of hardware devices to be modeled in association with a test of a software program, wherein the hardware devices are configured to interact with the software program over a network and monitor one or more physical entities; and
   instantiating virtual instances of each hardware device in the set of hardware devices, wherein each virtual instance is to:
      push a message to a host of the software program over the network to simulate a push message to be transmitted by the hardware device corresponding to the virtual instance;
      receive a request from the software program over the network;
      generate a simulated response to the request;
      send the simulated response to the host over the network connection; and
      model a physical effect of one of the physical entities as would be measured by the hardware device, wherein one of the message and response data are based on the modeled physical effect.

16. The method of claim 15, wherein each virtual instance is instantiated from a respective device profile, and each device profile defines respective models for the corresponding hardware device.

17. The method of claim 16, wherein the models comprise one of a request-response model and a push event model, and one of a hardware services model and a business services model.

18. The method of claim 16, further comprising receiving, through the graphical user interface, selection of a model attribute of the device profile to be applied to a particular one of the instantiated virtual instances.

19. The method of claim 15, further comprising monitoring performance of the software program in interoperation with the virtual instances.

20. The method of claim 15, wherein the set of hardware devices comprises a plurality of hardware devices.

21. The method of claim 20, wherein the plurality of hardware devices comprise a first hardware device of a first type and a second hardware device of a second type.

22. A computer program product comprising a non-transitory computer readable storage medium comprising computer readable program code embodied therewith, the computer readable program code comprising:
   computer readable program code configured to receive, through a graphical user interface, selection of a set of hardware devices to be modeled in association with a test of a software program, wherein the hardware devices are configured to interact with the software program over a network and monitor one or more physical entities;
   computer readable program code configured to instantiate virtual instances of each hardware device in the set of hardware devices, wherein each virtual instance is to:
      push a message to a host of the software program over the network to simulate a push message to be transmitted by the hardware device corresponding to the virtual instance;
      receive a request from the software program over the network;
      generate a simulated response to the request;
      send the simulated response to the host over the network connection; and
      model a physical effect of one of the physical entities as would be measured by the hardware device, wherein one of the message and response data are based on the modeled physical effect; and
   computer readable program code configured to perform a test of the software program based on interoperation of the software program with the virtual instances.

* * * * *